United States Patent [19]
Wark et al.

[11] Patent Number: 6,152,289
[45] Date of Patent: Nov. 28, 2000

[54] LINE BALANCE AND JAM PREVENTION APPARATUS FOR PARTS CONVEYED BETWEEN SERIALLY COUPLED MANUFACTURING STATIONS

[75] Inventors: Tommy Allen Wark, Akron; Thomas Barry Smith, Bay City; Eric Lapeng Chau, Jr., Franklin, all of Mich.

[73] Assignee: General Motors Corporation, Detroit, Mich.

[21] Appl. No.: 09/139,161

[22] Filed: Aug. 24, 1998

[51] Int. Cl.$^7$ .............................. B65G 47/34; B65G 47/26
[52] U.S. Cl. .................. 198/493; 198/460.1; 198/370.11
[58] Field of Search ................................. 198/493, 460.1, 198/370.11

[56] References Cited

U.S. PATENT DOCUMENTS

| | | | |
|---|---|---|---|
| 4,214,663 | 7/1980 | Schopp et al. | 209/552 |
| 5,165,520 | 11/1992 | Herve et al. | 198/460.1 |
| 5,392,928 | 2/1995 | Nickey et al. | 198/460.1 |
| 5,513,740 | 5/1996 | Affeldt et al. | 198/460.1 |

FOREIGN PATENT DOCUMENTS

0761545A2  3/1997  European Pat. Off. .

*Primary Examiner*—Christopher P. Ellis
*Assistant Examiner*—Mark A. Deuble
*Attorney, Agent, or Firm*—Laura C. Wideman; Michael J. Bridges

[57] ABSTRACT

An improved control apparatus that automatically maintains line balance and prevents part jam up in a manufacturing process by selectively removing parts from a conveyor line coupling successive manufacturing stations. The apparatus includes a stationary proximity sensor and air knife mounted with respect to the conveyor line, a timer, a solenoid-operated air valve for coupling the air knife to a source of compressed air, and an excess part bin adjacent the conveyor line. When the proximity sensor is closed for more than a first predetermined interval, an impending jam-up of parts is detected, and the timer activates the solenoid-operated air valve for a second predetermined interval, causing the air knife to blow one or more parts from the conveyor line into the excess parts bin. A manually operated switch may be provided for continually activating the air valve to remove all parts during maintenance operations. The apparatus is inexpensive and easily installed by simply clamping the proximity sensor, the air knife and the excess parts bin on a conveyor support structure. A control unit containing the solenoid operated air valve and the timer is placed adjacent the conveyor. The control apparatus is easily adapted to any conveyor line, operates reliably over extended periods of time due to the lack of moving parts, and is easily maintained due to its simplicity and small number of parts.

1 Claim, 1 Drawing Sheet

LINE BALANCE AND JAM PREVENTION APPARATUS FOR PARTS CONVEYED BETWEEN SERIALLY COUPLED MANUFACTURING STATIONS

TECHNICAL FIELD

This invention relates to an automated manufacturing process involving multiple serially performed manufacturing steps with parts in process being transported from one manufacturing station to the next on a conveyor belt, and more particularly to an apparatus for automatically balancing part flow between adjacent stations and preventing part jam-up due to manufacturing anomalies.

BACKGROUND OF THE INVENTION

Automated manufacturing processes frequently employ multiple manufacturing stations, with parts in process being transported from one station to the next on a conveyor belt. For example, it is customary in the manufacture of cylindrical metal pins or shafts to route the individual parts in process through a series of through-feed grinders, each grinder removing material until the desired diameter and surface finish are achieved. Ideally, the manufacturing stations would be synchronized to maximize throughput of parts without backing up parts on the conveyor belt. However, the throughput of an individual manufacturing station often changes due to wear (particularly in grinding or cutting operations), and a back-up at one station can cause jam-ups at other upstream stations. Accordingly, manual controls are usually provided to enable an operator to adjust the conveyor speed to suitably balance the line and prevent jam up of parts between stations. Obviously, manual control of line speed is undesired because of the labor cost and because of the difficulty of manually optimizing the control.

SUMMARY OF THE INVENTION

The present invention is directed to an improved control apparatus that automatically maintains line balance and prevents part jam up in a manufacturing process by selectively removing parts from a conveyor coupling successive manufacturing stations. The apparatus includes a stationary proximity sensor and air knife mounted with respect to the conveyor line, a timer, a solenoid-operated air valve for coupling the air knife to a source of compressed air, and an excess part bin adjacent the conveyor line. When the timer detects a condition of insufficient spacing between adjacent parts on the conveyor belt, an impending jam-up of parts is indicated, and the timer activates the solenoid-operated air valve for a predetermined interval, causing the air knife to blow one or more parts from the conveyor line into the excess parts bin. In a preferred embodiment, an impending jam-up is detected when a switch activated by the proximity sensor is closed for more than a predetermined interval which is longer than the time ordinarily required for one of the parts to move past the proximity sensor. Conveniently, a manually operated switch may be provided for continually activating the air valve to remove all parts during maintenance operations.

The above-described control apparatus is inexpensive and easily installed by simply clamping the proximity sensor, the air knife and the excess parts bin on a conveyor support structure. A control unit containing the solenoid operated air valve and the timer is placed adjacent the conveyor. The control apparatus is easily adapted to any conveyor line, operates reliably over extended periods of time due to the lack of moving parts, and is easily maintained due to its simplicity and small number of parts.

DESCRIPTION OF THE PREFERRED EMBODIMENT

Figure 1:
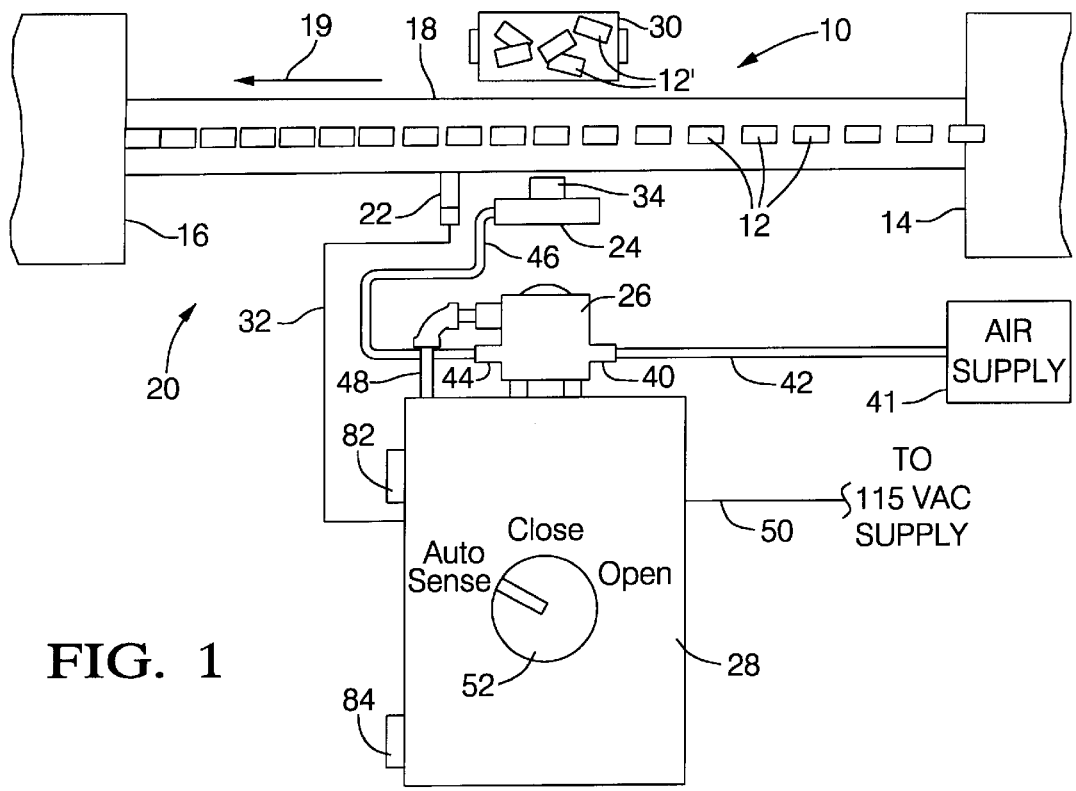
FIG. 1 is a top view diagram of a manufacturing process and the control apparatus of this invention, including a control unit.

Referring to the drawings, and particularly to FIG. 1, the reference numeral 10 generally designates a portion of a manufacturing operation, and the reference numeral 20 generally indicates the line balance and jam prevention control apparatus of this invention. In the illustrated embodiment, the parts-in-process are cylindrical metal pins 12, the manufacture of which involves a series of successive through-feed grinding operations at different work stations. For example, in FIG. 1 the parts 12 are fed into a rough grinder 14, and then into a finish grinder 16, each grinder removing material from the part 12 until the desired diameter and surface finish are achieved. The through-feed grinders 14, 16 receive the parts from a conveyor belt, such as the conveyor belt 18 connecting the grinders 14, 16, and the parts 12 pass through the grinders at a rate determined by the grinder settings and the wear of the grinding wheels. Grinders meeting this description are manufactured and sold by Cincinnati Millicron Company, for example. The conveyor belt 18 transports the parts 12 from grinder 14 to grinder 16 as indicted by arrow 19; thus, grinder 14 is referred to as an upstream grinder, and grinder 16 is referred to as a downstream grinder. The conveyor speed can be manually adjusted to provide a proper spacing between parts supplied to the downstream grinder 16. If the spacing is too small, as illustrated in the vicinity of arrow 19, the parts 12 back up into the downstream grinder 16, which can damage the grinding wheels and cause a back-up of parts in the upstream grinder 14. If the spacing is too large, the manufacturing efficiency is reduced and the parts may not be machined properly.

The control apparatus 20 comprises a proximity sensor 22, an air knife 24, a solenoid operated air valve 26, a control unit 28, and an excess parts bin 30. The proximity sensor 22 and air knife 24 are clamped onto a frame element supporting the conveyor belt 18, with the proximity sensor 22 located downstream from the air knife 24. The proximity sensor 22 is positioned to detect the presence of a part 12 on conveyor belt 18, and provides a part detection signal to control unit 28 via line 32. An example of a suitable proximity sensor is the part number E57 LAL 18A2 E3 Proximity Switch, manufactured by Cutler/Hammer Corporation. The air knife 24 includes a nozzle 34 positioned adjacent the parts 12 so that when activated by control unit 28, a blast of compressed air blows the parts passing nozzle 34 into the excess parts bin 30. Excess parts in the bin 30 are identified by the reference numeral 12', and are periodically returned to the conveyor belt 18 for completion of the manufacturing process. The air valve 26 is mounted on the control unit 28, and has an inlet port 40 coupled to a source of compressed air 41 via flexible hose 42, and an outlet port 44 coupled to air knife 24 via flexible hose 46. Electrical connections between the air valve 26 and control unit 28 are encased in conduit 48. Air valve 26 normally isolates inlet port 40 from outlet port 44, but couples the ports 40, 44 when control unit 28 activates a solenoid coil (not shown) internal to air valve 26. Any standard solenoid-operated air valve may be used for this purpose.

The control unit 28 is located in the vicinity of conveyor belt 18, as permitted by the line 32 and hose 46, and is coupled to a source of AC, as indicated by the power cord 50. A manually positioned control knob 52 enables a operator to select one of three settings: Auto Sense, Close and Open. When the control knob 52 is positioned to the Close setting, the apparatus 20 is deactivated. When positioned at the Open setting, the control unit 28 continually activates the air valve 26 to blow all parts 12 off the conveyor belt 18, clearing the belt 18 of parts during maintenance operations. When positioned at the Auto Sense setting, the control unit 28 operates as described below to automatically remove excess parts 12'from conveyor belt 18, as required to balance the line and prevent part jam up.

Figure 2:
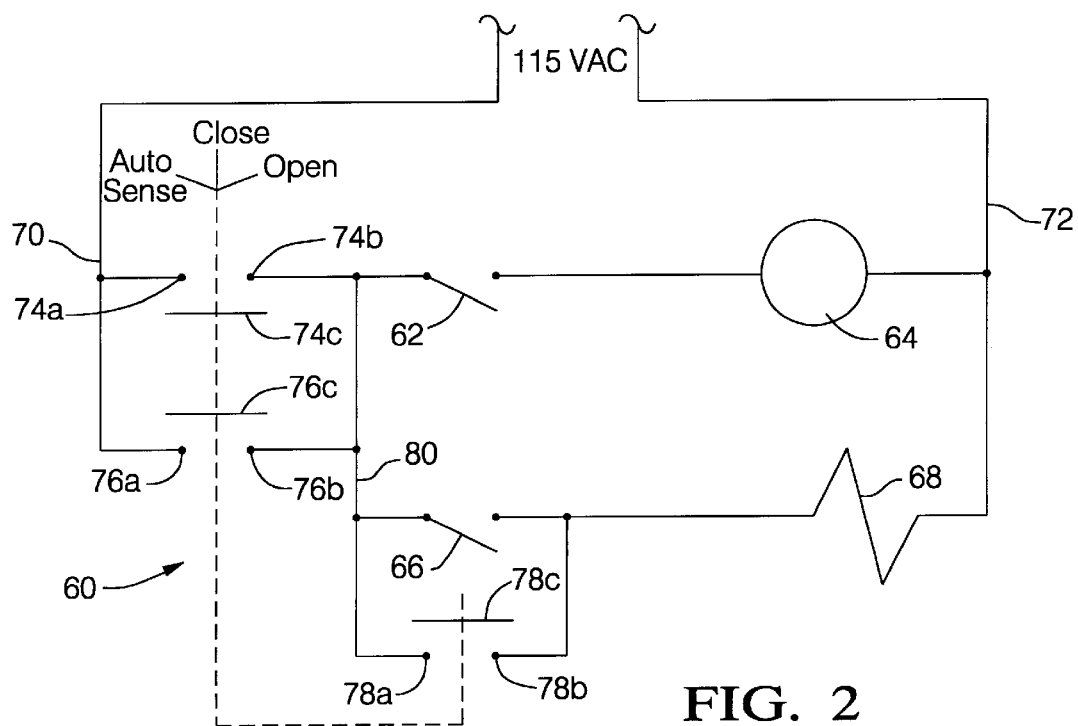
FIG. 2 is a circuit diagram of the control unit of FIG. 1.

FIG. 2 depicts a circuit diagram of the control apparatus 20. The various elements depicted include a three-pole switch 60 coupled to control knob 52 of FIG. 1, a single-pole switch 62 which may be internal to proximity sensor 22, an industrial timer 64, a timer controlled switch 66, and a solenoid coil internal to air valve 26. An AC supply voltage, illustrated as 115 VAC, is connected across lines 70 and 72.

The switch 60 has three pairs of contacts designated as 74a–74b, 76a–76b and 78a–78b, and three mechanically ganged contact arms 74c, 76c and 78c. The switch 60 is depicted with control knob 52 positioned at the Close setting; in such case, the contact pairs 74a–74b, 76a–76b and 78a–78b are all open-circuited so that the power supply is disconnected from the other circuit elements. When control knob 52 is positioned at the Open setting, the contact arms 74c–78c move downward relative to the position depicted in FIG. 2 to electrically couple the contact pairs 76a–76b and 78a–78b, thereby energizing the solenoid coil 68. This activates air valve 26 to supply compressed air to air knife 24 as described above for the purpose of removing all parts 12 from the conveyor line 18, during maintenance operations, for example. When control knob 52 is positioned at the Auto Sense setting, the contact arms 74c–78c move upward relative to the position depicted in FIG. 2 to electrically couple the contact pair 74a–74b. This connects line 72 to the line 80, but does not result in energization of solenoid coil 68 until the normally open timer switch 66 closes, or in the application of power to timer 64 until the normally open proximity switch 62 closes.

Timer 64, which may be a type 328C 200 Q 10XX timer manufactured by Automatic Timing Control Corporation, operates when coupled to an AC power source for a first prescribed period of time to close the switch 66 for a second prescribed period of time. The prescribed time periods may be manually adjusted, as indicated by the control knobs 82 and 84 in FIG. 1 which are mechanically coupled to the timer 64.

In operation, the proximity switch 62 closes when a part 12 passes in front of proximity sensor 22. The switch 62 remains closed until the part 12 is no longer in front of the sensor 22, and then re-opens. So long as the switch 62 is closed for less than the first prescribed period of timer 64, the timer controlled switch 66 remains open. The first prescribed period is chosen to be greater than the time ordinarily required for a single part 12 to pass the sensor 22. Once the proximity switch 62 re-opens as described above, the timer 64 is reset to begin timing the first prescribed period upon re-closure of the switch 62. However, if the spacing between two or more parts 12 is reduced to the point where the proximity switch 62 stays closed continuously during the passage of two successive parts 12, the switch 62 will be closed longer than the first prescribed period, activating the timer 64 to close the switch 66 for a second prescribed period sufficient to remove one or more parts 12 from the conveyor line 18. By way of example, the first prescribed interval may be set to approximately 1.5 seconds, and the second prescribed period may be set to approximately 1.3 seconds.

The removal of the part(s) 12 opens up the spacing between the sensed part and the next part in line, thereby automatically balancing the part spacing regardless of the conveyor belt speed. Accordingly, the line speed and the grinder speeds do not have to be continually adjusted, and the control apparatus 20 automatically maintains the number of parts between manufacturing stations (i.e., between grinders 14 and 16) at an optimal level. The apparatus 20 also operates to prevent part jam up even if the parts 12 fail to feed into the downstream grinder 16. If the parts begin to jam up, the proximity switch 62 closes continually, causing the timer 64 to repeatedly cycle the switch 66 for the prescribed period, thereby preventing the parts 12 from backing up into the upstream grinder 14.

The simplicity and flexibility of the above described control apparatus 20 makes it easy to install and maintain, and adaptable to a variety of applications. There are no moving parts to wear out or adjust, and the proximity sensor 22 and air knife 24 simply clamp on the conveyor framework supporting the belt 18. While the control apparatus 20 has been described in reference to the illustrated embodiment, it is expected that various modifications will occur to those skilled in the art. For example, the control circuit may be configured to measure the gap between detected parts 12, and to activate the air valve 26 when the measured gap is smaller than a prescribed time period. Accordingly, it will be understood that the scope of this invention is not limited to the illustrated embodiment, and that an apparatus incorporating such modifications may fall within the scope of this invention, which is defined by the appended claims.

What is claimed is:

1. Apparatus for balancing the spacing of parts being conveyed on a moving belt from an upstream manufacturing station to a downstream manufacturing station, comprising:

a proximity sensor mounted stationary with respect to the moving belt so as to detect presence of a part moving past said sensor on said belt, said sensor including a switch that is activated so long as the presence of the part is detected;

a source of compressed air;

an air knife mounted stationary with respect to the moving belt upstream of said proximity sensor, and effective when coupled to said source of compressed air to direct a blast of air against a part passing said air knife on said belt, thereby blowing such part off said belt and into a part collection bin;

an air valve effective when energized to couple said source of compressed air to said air knife;

a timer responsive to the activation of said switch which detects a condition of insufficient spacing between adjacent parts on said belt; and in response to said detection, energizing said air valve for a prescribed period sufficient to blow one or more of said parts off said belt and into said part collection bin; and a manually operable switch positionable to override said timer and to continuously energize said air valve for continuously blowing parts off said belt and into said part collection bin.

* * * * *